Aug. 3, 1954 W. H. SILVER ET AL 2,685,241
QUICK DETACHABLE IMPLEMENT
Filed June 17, 1949 4 Sheets-Sheet 3
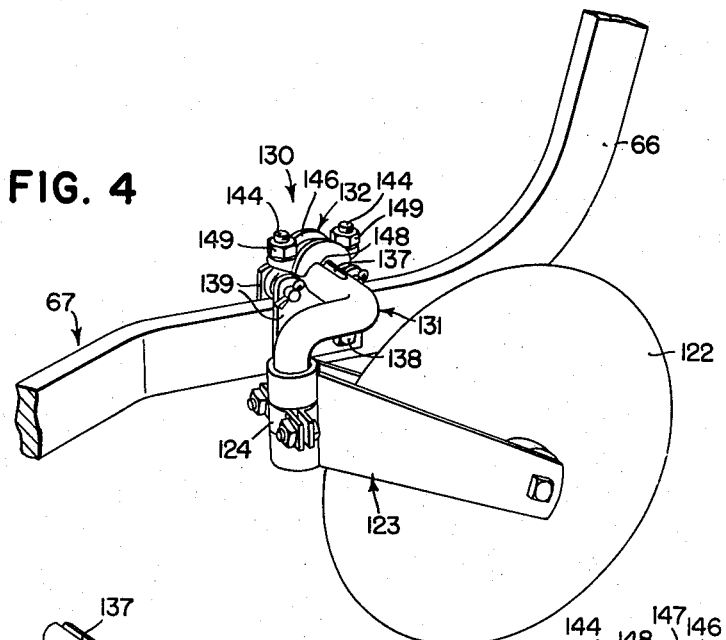
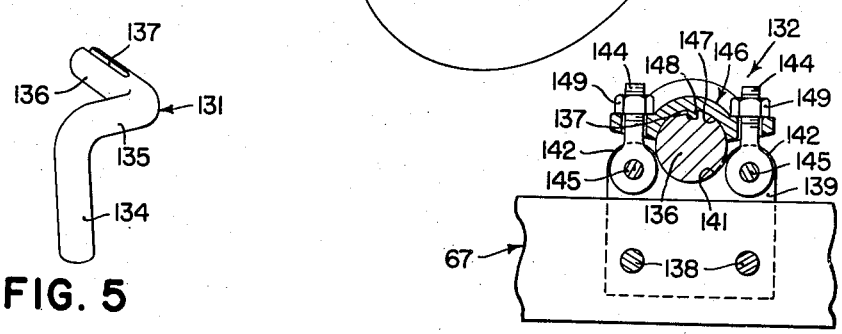
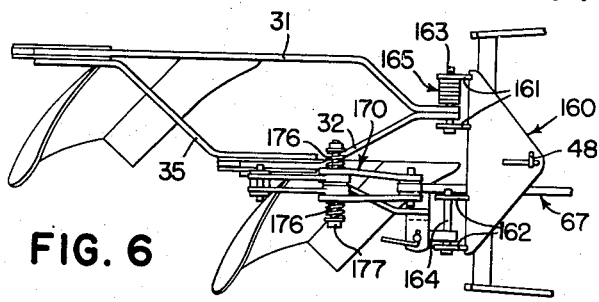
INVENTORS.
WALTER H. SILVER
WILLIAM V. LOHRMAN
BY
ATTORNEYS Aug. 3, 1954

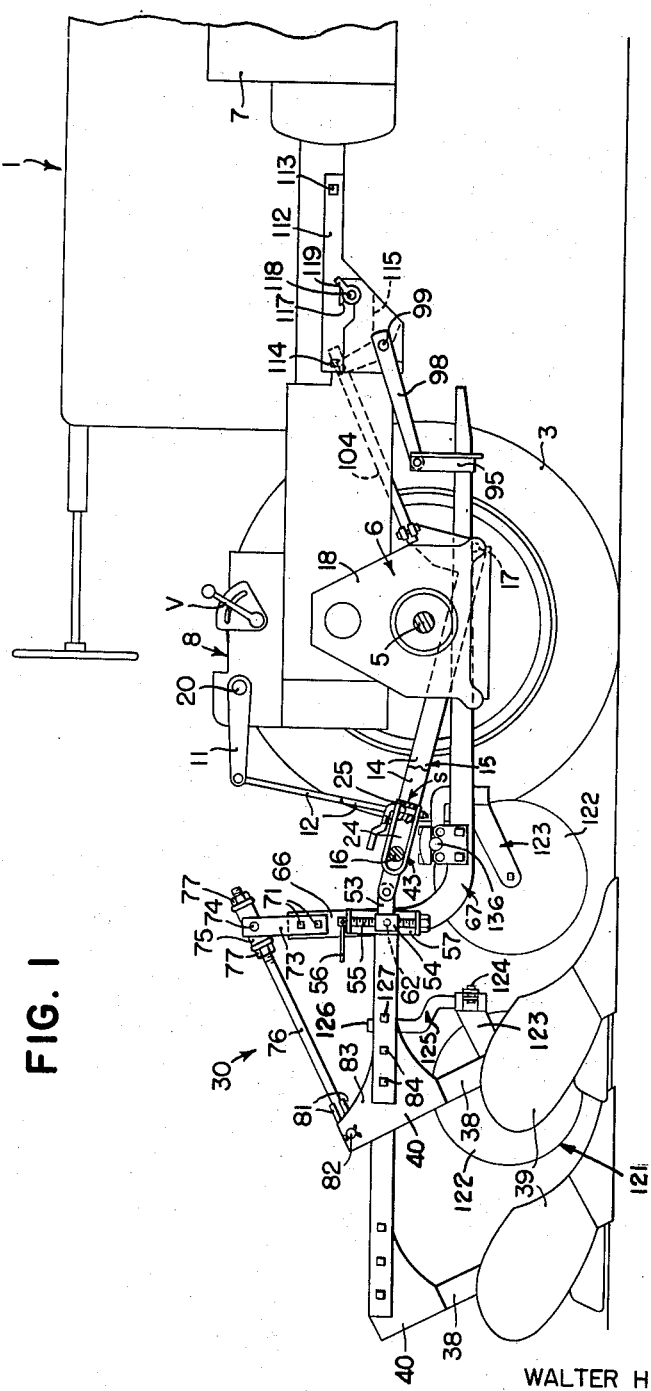

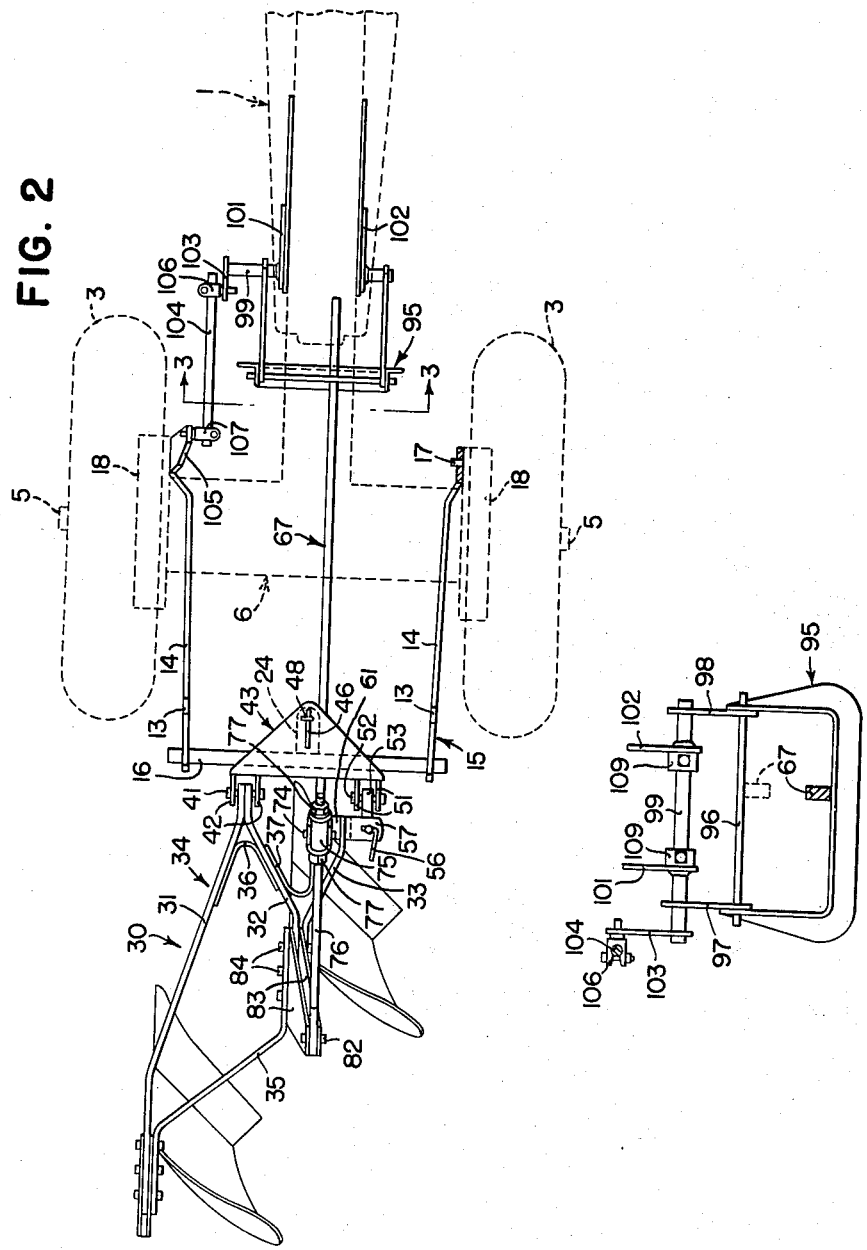

W. H. SILVER ET AL 2,685,241

QUICK DETACHABLE IMPLEMENT

Filed June 17, 1949

INVENTORS.
WALTER H. SILVER
WILLIAM V. LOHRMAN
BY

ATTORNEYS

Patented Aug. 3, 1954

2,685,241

UNITED STATES PATENT OFFICE 2,685,241

QUICK DETACHABLE IMPLEMENT

Walter H. Silver, Moline, Ill., and William V. Lohrman, Davenport, Iowa, assignors to Deere & Company, Moline, Ill., a corporation of Illinois Application June 17, 1949, Serial No. 99,772

3 Claims. (Cl. 97—47.14)

This application is a continuation-in-part of our co-pending application, Serial No. 578,148, filed February 16, 1945, now U. S. Patent 2,567,736, dated September 11, 1951.

The present invention relates generally to agricultural machines and more particularly to integral or tractor mounted implements.

The object and general nature of the present invention is the provision of a new and improved integral implement which may easily and quickly be attached to or detached from its supporting tractor and in which the implement may be readily attached to the tractor by backing the tractor in position.

More particularly, it is a feature of this invention to provide new and improved depth adjusting means for adjusting the depth of operation of the tools by raising or lowering the front and rear ends of the tool beams substantially the same amount. Another feature of this invention is a provision of quick detachable means for connecting the depth adjusting means with the tractor.

More specifically, it is an important feature of this invention to provide an agricultural implement that is adapted to be attached to a vertically swingable drawbar on the propelling tractor, which implement includes a forwardly extending beam member also connected with the tractor for generally vertical movement, and another important feature of the present invention is the provision of such an implement in which the latter is so constructed and arranged as to have lateral swinging movement relative to the tractor drawbar, the means on the tractor receiving the front end of the beam member of the implement accommodating lateral swinging thereof.

An additional feature of the present invention is the provision of a new and improved colter support especially constructed for use with an implement of the type described above, namely, one in which the implement is connected with a vertically swingable drawbar on the propelling tractor and which includes a forwardly extending stabilizing beam member to which the colter support preferably is connected.

These and other objects and advantages of the present invention will be apparent to those skilled in the art after a consideration of the following detailed description, taken in conjunction with the accompanying drawings in which the preferred forms of the present invention have been illustrated.

In the drawings:

Figure 1 is a side view of a quick-detachable implement, such as a two-bottom plow, showing the same as mounted in position on its propelling and supporting tractor.

Figure 2 is a plan view of the implement shown in Figure 1, the tractor being indicated in dotted lines in order to show the implement parts more clearly.

Figure 3 is a sectional view taken generally along the line 3—3 of Figure 2.

Figure 4 is a perspective view of the colter mounting, particularly designed for the plow shown in Figures 1-3.

Figure 4a is an enlarged sectional view of the colter shank clamp.

Figure 5 is a perspective view of the colter shank preferably employed in the colter mounting shown in Figure 4.

Figure 6 is a fragmentary plan view showing a modified construction in which provision is made for adjusting the hitch plates for regulating the cut of the front plow bottom.

Figure 7:
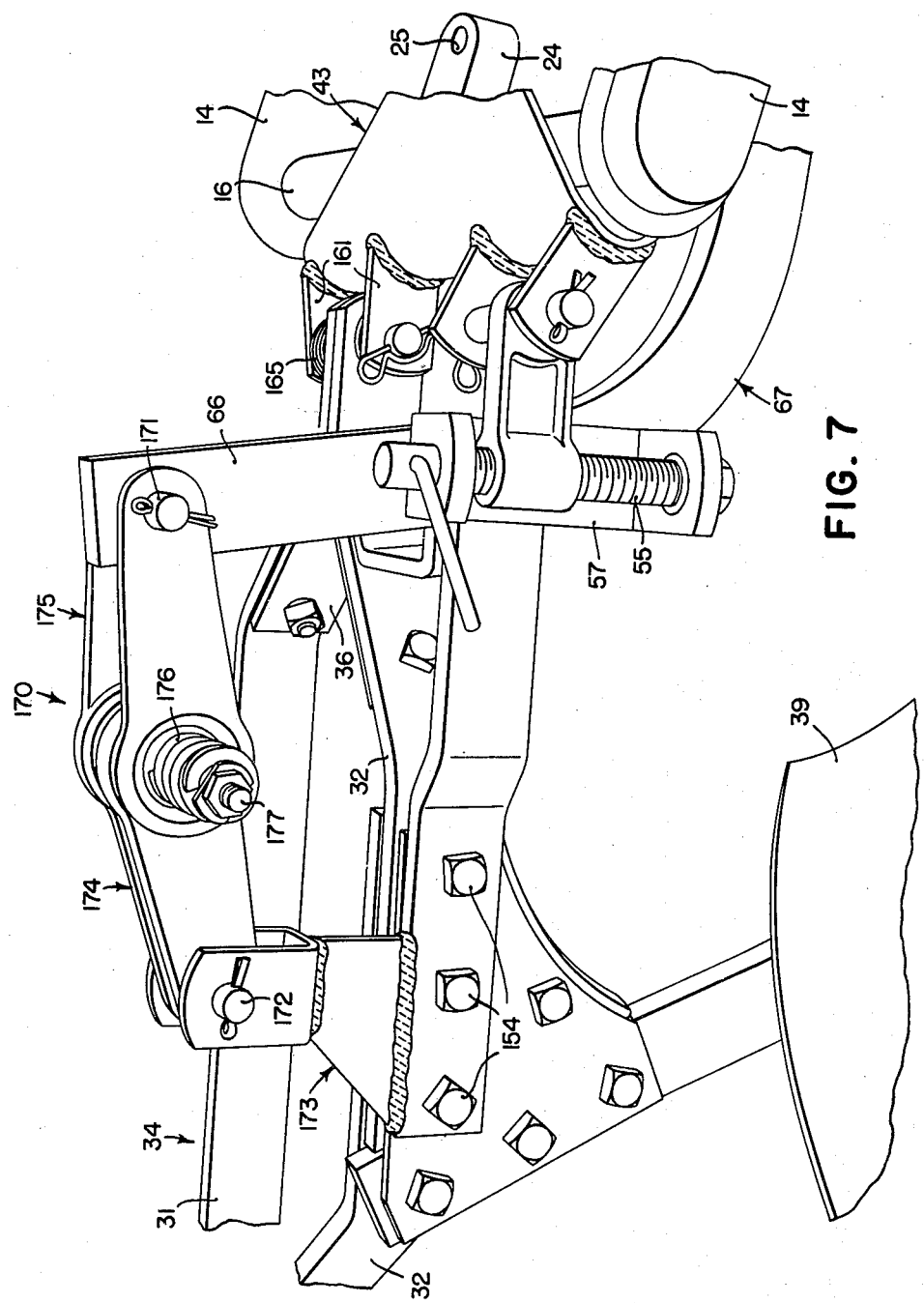
Figure 7 is a fragmentary perspective view, made at a larger scale, of the hitch arrangement shown in Figure 6.

Referring now to the drawings, particularly Figures 1 and 2, the reference numeral 1 indicates a farm tractor of the four wheel type, having rear wheels 3 mounted on axle means 5 carried by a rear axle structure 6. The tractor includes a power plant 7 and a power lift unit 8 of the hydraulic type, such as is shown in the U. S. Patent 2,477,710, issued August 2, 1949, to Worstell, including suitable valve mechanism V and other necessary parts, such as a pair of lift arms 11 and links 12 connecting the arms 11 to lugs 13 formed on the side members 14 of a generally vertically swingable tractor drawbar or bail member 15. The latter is preferably in the form of a U-shaped member, considered as a whole, and includes a rear transverse section 16 which may be formed of round stock. The sides 14 may be strap members, and the latter are pivoted at their front ends, as at 17, to drop housings 18 which form a part of the tractor rear axle structure 6. Preferably, the rear part 16 is welded or otherwise permanently secured to the side parts 14 of the tractor drawbar or bail 15. The two power lift arms 11 are clamped or otherwise fixed in any suitable manner to the ends of a power lift rockshaft 20 which forms a part of the hydraulic unit 8. As best shown in Figure 2, a lug 24 is welded or otherwise permanently fixed to the central section 16 of the tractor drawbar 15 and is apertured, as at 25, to receive certain types of implements, such as a two-bottom plow, which may be reducible to a one-bottom plow, if desired.

According to the principles of the present invention, a two-bottom plow of the quick-attachable type, indicated in its entirety by the reference numeral 30, is adapted to be connected with the tractor drawbar 15. The two-bottom plow 30 comprises plow beam members 31, 32 and 33, suitably connected together to form a plow frame 34. The frame 34 also includes suitable braces 35, 36 and 37. Secured to the rear end of each of the plow beams 31 and 32 is a downwardly and forwardly extending standard 38 to which a moldboard plow bottom 39 is attached in any suitable way. A bracket structure 40 serves to fix each standard 38 to the associated plow beam.

The two left-hand plow beam members 31 and 32 are formed to converge forwardly, as best shown in Figure 2, and their forward converged ends are apertured to receive a pivot pin 41 which extends through a pair of lugs 42 welded or otherwise secured to a saddle member 43. The latter member is formed preferably of flat stock bent over onto itself in generally U-shaped configuration, as best shown in Figure 1, and the stock is trimmed so as to form a generally triangular structure, as shown in Figure 2. The forward apex section of the saddle member 43 is apertured to receive a detachable hitch pin 46, the hitch pin including a lower end section 47 adapted to pass downwardly through the openings in the saddle member 43 and the opening 25 in the bracket member 24 that is secured to the tractor drawbar member 16. A spring clip 48 serves to retain the hitch pin 46 in position. A second pair of rearwardly extending lugs 51 is fixed to the rear side of the saddle member 43 and receives a pivot pin 52 that passes through an apertured ear 53 formed on and extending forwardly of a vertically adjustable lug 54. The latter member is internally threaded to receive a leveling screw 55 which is rotated by a handle 56 and is held for rotation in a vertical U-shaped bracket 57. The bracket 57 is fixed to the forward end of the right-hand plow beam member 33, as best shown in Figure 2. A laterally inwardly extending bracket 61 is also fixed to the front end of the right-hand plow beam member 33 and receives a pivot 62 that extends in a transverse direction through an opening in the rear upturned end 66 of a longitudinally extending bar or stabilizing member 67. The rear end of the stabilizing bar or beam 67 is upturned and is apertured to receive a pair of bolts 71 which secure to the bar 67 a pair of spaced brackets 73 which are apertured to receive the trunnions 74 of a sleeve member 75. The forward threaded end of an adjusting strut 76 passes through the sleeve 75 and receives a pair of lock nuts 77 thereon. The rear end of the strut or link 76 receives a pair of pivot clamps 81 which are connected by a pivot pin 82 to a pair of generally outwardly offset, upwardly extending bracket plates 83, the lower portions of which are secured by the same bolts 84 that fasten the two plow beam members 32, 33 and the brace 35 together.

The front end of the stabilizing bar or beam 67 is arranged, when the two-bottom plow 30 is attached to the tractor, to extend forwardly underneath the rear axle 6 of the tractor and at its forward end rests in a vertically shiftable, depth adjusting bail member 95, the upper ends of which, as best shown in Figure 3, are apertured to receive a cross bar 96 that is carried in the rear lower ends of a pair of arms 97 and 98 which at their upper or forward ends are welded or otherwise suitably fixed to a cross shaft 99. The latter is supported in suitable bearing brackets 101 and 102 and at one end has an arm 103 fixed thereto and connected by a link 104 to an arm 105 formed on the left side member 14 of the tractor drawbar bail 15. Connection between the front end of the link 104 and the arm 103 is effected by means of a clamping swivel 106, and a similar clamping swivel 107 serves to connect the rear end of the link 104 with the upper end of the arm 105. The cross shaft 99 is held in the desired lateral position with respect to the bearing brackets 101 and 102 by clamp collars 109.

The two bearing plates 101 and 102 are adapted to be readily and quickly attachable to and detachable from the tractor 1, preferably the intermediate portion thereof forward of the rear axle 6. To this end, the tractor carries a pair of attaching plates 112, bolted to the tractor, as at 113 and 114. Each of the attaching plates 112 is provided with a forwardly facing notch 115 (shown in dotted lines in Figure 1) which is adapted to receive the cross shaft 99, the upper and lower edges of the notch 115 flaring downwardly and forwardly to facilitate movement of the shaft 99 and associated parts into position. Also, each of the bearing brackets 101 and 102 is provided with a rearwardly facing notch 117 which is adapted to receive a stud 118 carried by the associated tractor attaching bracket 112, each stud 118 receiving a wing nut 119.

The two-bottom plow 30 preferably is provided with a rolling colter for each of the plow bottoms. The rolling colter for the rearmost plow bottom 39 is indicated in its entirety by the reference numeral 121 and is of conventional construction, comprising a colter disk 122 mounted for rotation in the rear and lower portion of a colter yoke 123 which at its forward or upper portion is connected by a clamp 124 for limited lateral swinging movement to the lower end of a colter shank 125. The latter member includes a vertically extending section 126 which is secured to the left-hand plow beam 31 by a colter clamp 127, the end 126 extending vertically a sufficient distance above the beam 31 to provide for any desired vertical adjustment of the colter. This colter construction, just described, is conventional so far as the present invention is concerned, but a colter unit of this kind cannot be supplied for the forwardmost plow bottom 39, due to the likelihood of the upper section 126, which must necessarily extend upwardly above the beam a substantial distance, striking or colliding with parts of a tractor and/or tractor hitch structure since the colter unit for the forwardmost plow bottom must be disposed substantially directly underneath the saddle member 43. Accordingly, the present invention contemplates a novel form of colter support, especially adapted for the plow just described and any other plow construction in which the space available for colter mounting is limited. Our new colter support will now be described.

As best shown in Figure 4, the colter support of the present invention is indicated in its entirety by the reference numeral 130 and comprises a specially formed colter shank 131 and a shank clamp unit 132 carried by the stabilizing bar or beam 67 immediately forwardly of the upturned end 66 thereof, which disposes the colter substantially directly underneath the saddle member 43. As best shown in Figure 5, the colter shank 131 comprises a lower yoke-receiving section 134 extending substantially perpendicular to a fore and aft extending intermediate colter shank section 135 and an attaching section 136 that extends laterally substantially at right angles to the intermediate section 135. The attaching section 136 is provided with an elongated slot 137 formed in the upper side thereof. The attaching section 136 is adapted to be disposed transversely relative to the stabilizing bar 67, and to be adjusted laterally inwardly or outwardly relative to the beam in a transverse direction. The colter clamp unit 132 is especially constructed to accommodate not only the above-mentioned in-and-out movement of the colter shank 131 relative to the beam 67, but also to provide means for rocking the colter shank 131 about a transverse axis so as to provide for raising or lowering the colter disk 122. The colter clamp unit 132 will now be described.

Attached to opposite sides of the beam 67, as by bolts 138 or the like, is a pair of clamp plates 139, each of which is provided with an upwardly facing recess 141 and upwardly extending apertured lugs 142. When the plates 139 are attached to the beam 67, the recesses 141 and the apertures in the lugs 142 are disposed in alignment. The recesses 141 form a socket to receive the lower side of the attaching section 136 of the colter shank 131. A pair of pivot bolts 144 are swingably mounted on pins 145 carried in the apertures in the lugs 142, and the pivot sections of the bolts 144 extend upwardly through apertures in a clamp cap 146. The clamp cap 146 is provided with a downwardly facing recess section 147 shaped to receive the upper side of the attaching section 136 of the colter shank 131, and a rib 148 is carried in the recess 147, extending downwardly and shaped to enter the slot 137 in the colter shank. The rib 148 and the slot 137 form interlocking means acting between the attaching section 136 of the colter shank 131 and the clamp 146, whereby loosening the nut 149 on one of the clamping bolts 144 and tightening the nut on the other clamping bolt 144 serve to rock the colter shank 131 about the transverse axis as defined by the attaching section 136. This raises and lowers the colter disk 122 which, as described above, is attached to the lower or colter-receiving section 134 of the colter shank 131 by the colter yoke clamp 124. By loosening both of the nuts 149 the colter shank 131 may be shifted laterally inwardly or outwardly, as desired. It will thus be observed that without having any upwardly extending parts, such as the upper end 126 of the colter shank 125 described above, the forwardmost colter disk 122 may be raised or lowered by rocking the colter shank 131 about a transverse axis on the beam 67 and also that the colter may be shifted inwardly or outwardly relative to the beam 67 by merely loosening the cap 146.

The operation of the above-described embodiment of this invention is substantially as follows.

Figure 1 shows the parts in operating position, and it will be noted that as the outfit moves forwardly, the pressure of the soil against the plow bottoms 39 tends to cause the tool unit, which includes the bottoms 39, the stabilizing bar or longitudinal beam 67 and associated parts, to tend to swing about the axis defined by the rear cross bar member 16 on the tractor bail or drawbar 15. This movement is, however, restrained by the engagement of the front end of the bar 67 in the depth adjusting or vertically swingable bail 95. The position of the latter depends upon the position of the tractor drawbar or bail 15, since they are linked together by the link 104 and associated parts, as best shown in Figure 1. If it should be desired to cause the plow bottoms 39 to operate at increased depth, the valve mechanism V is operated so as to permit the bail 15 to lower the desired amount. The lowering of the bail 15 exerts a pull on the links 104 which, in turn, serves to lower the front or depth adjusting bail 95, and the connections are so arranged that the bail 95 is lowered, or raised, substantially the same as the cross bar 16 of the tractor drawbar 15, whereby the position of the tool is changed as desired but the tool is moved into different parallel positions relative to the tractor.

When it is desired to lift the tool into a transport position, the valve V is operated to cause the power lift arms 11 to be swung upwardly. Since the greater weight of the tool lies rearwardly of the bar 16, the first effect of the lifting action is to raise the front end of the stabilizing bar 67 upwardly until it contacts the pivot bar 96 (see dotted line position of the bar 67 in Figure 3). After this contact is established the further upward movement of the lifting arms 11 serves to raise the entire implement, but the upward movement of the front end of the bar 67 has the advantage that in the first part of the lifting action the plow bottoms 39 are tipped upwardly so as to aid and accelerate their running out of the ground. When first lowering the bottoms into the ground to start operation, the front end of the bar 67 remains in contact with the bar 96 until the rearward pressure of the soil against the lower portions of the bottoms 39 serves to swing the bar 67 down against the bail 95 in its normal position.

The saddle member 43 forms a forwardly facing socket s and when attaching the implement to the tractor, the latter is backed with the drawbar 16 disposed in a position to enter between the upper and lower portions of the saddle member 43, after which the hitch pin 46 may be placed in the apertured portions of the saddle member 43 and the forward apertured lug 24 of the tractor drawbar. The relative angular position of the stabilizing bar 67 to the plow frame may be adjusted by loosening one of the lock nuts 77 and tightening the other, thereby shifting the sleeve 75 along the strut 76 in one direction or the other and thus pivoting the plow frame about its pivotal connection with the longitudinal stabilizing bar or plow beam 67. The plow may be leveled by turning the adjusting screw 55 in one direction or the other. It will be noted that uniform depth of operation is normally maintained even though the tractor may pass over uneven ground. For example, it will be remembered that the tractor drawbar 15 and its connections are so arranged that the drawbar 15 in any position of adjustment may move momentarily upwardly out of that position and then downwardly back to that particular position without material restraint. Thus, in case the front wheels 2 of the tractor pass over a ridge or the like, the upward tilting of the front end of the tractor does not force the plow bottoms 39 into the ground beyond normal depth because under the conditions just assumed the tractor drawbar 15 momentarily rises with respect to the rear end of the tractor. Likewise, if the front wheels 2 of the tractor should drop into a hole or the like, the rear drawbar 15 is, of course, pulled upwardly, since it cannot move downwardly with respect to the tractor, but this does not pull the tools out of the ground to any appreciable extent since the front end of the stabilizing bar 67 merely rises momentarily to the upper cross bar 96 (dotted lines, Figure 3). This action, although momentary, minimizes the variation in the depth of operation of the tools in the event the front wheels of the tractor drop into a depression.

In Figure 6 we have shown a modified form of the present invention in which provision is made for adjusting the hitch connection between the plow frame and the saddle member 43 so as to regulate the cut of the front bottom and maintain or secure the correct line of draft. Referring now to Figure 6, the saddle member 160 is appreciably wider than the saddle member 43 and at the left side is provided with two laterally spaced, rearwardly extending apertured lugs 161, and at the right side is provided with two similar laterally spaced, apertured lugs 162. A transverse pin 163 is carried by the lugs 161 and a similar transverse pin 164 is carried by the lugs 162. The front ends of the frame bars 31 and 32 are carried on the pin 163, and the front end of the right-hand frame bar 33 is carried on the pin 164, the lugs 161 and 162 being spaced apart a distance sufficiently great to accommodate a lateral movement of the plow frame 34. A plurality of spacers 165 is disposed on the pin 163, which is so constructed and arranged as to be readily detachable from the lugs 161, and the lateral position of the plow frame is adjusted relative to the saddle or socket member 160 for changing one or more of the spacers 165 from one side of the associated frame members 31 and 32 to the other side.

A further modified form of the present invention is shown in Figure 7. Referring now to this figure, it will be noted that the adjusting strut 76 (Figure 1) and associated parts may be replaced by an overload release device in the form of a toggle linkage 170 connected at its front end, as by a pin 171, with the upper end of the upwardly extending portion 66 of the stabilizing beam 67. The rear end of the toggle linkage 170 is connected by a pin 172 to a bracket 173 fixed, as by welding, to the rear portion of the frame member 32. The toggle linkage 170 comprises a pair of pivotally interconnected links 174 and 175 having their interconnected ends provided with cams which when the links pivot cause the interconnected ends of the links to separate against the force of resilient members 176 disposed about the ends of a pivot bolt 177 which defines the pivot axis about which the links 174 and 175 may move under an overload. So far as the present invention is concerned, the particular details of the overload release toggle linkage 170 are not new, being substantially the same as those shown in the prior patent to John I. Cantral 2,337,026, dated December 21, 1943, to which reference may be made if necessary.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. The combination with a tractor having a vertically swingable bail and means on the tractor for swinging said bail, of an agricultural machine including a ground working tool, an attaching part shaped to receive the rear portion of said bail, draft-transmitting means pivotally connecting said attaching part with said tool for movement relative thereto about a generally transverse axis, means for pivoting said attaching part to said bail for lateral swinging relative thereto, a member connected with said tool in laterally rigid relationship and extending forwardly of the tractor beyond said bail, and means on the tractor operatively connected with the forward end of said rigid member for raising and lowering the latter, said last mentioned means including a generally vertically shiftable part extending generally laterally of the tractor and slidably receiving the forward end of said rigid member so as to accommodate lateral swinging of the attaching part and ground working tool relative to the tractor.

2. A plow adapted to be connected to a tractor having a vertically swingable bail and means on the tractor for swinging said bail, said plow comprising means serving as a frame, furrow opening means rigidly fixed thereto, an attaching part shaped to receive the rear portion of said bail and to be held against movement relative to said bail in a generally vertical direction, means pivoting said frame means to said part for movement relative thereto about a generally transverse axis, means for pivoting said attaching part to said bail for lateral swinging movement relative thereto about a generally vertical axis, a stabilizing member, pivot means disposed adjacent said axis for pivotally connecting said stabilizing member adjacent its rear end to said frame means, said stabilizing member extending from said pivot means forwardly relative to the tractor, strut means connected between said frame means and said stabilizing member for holding the latter rigid relative to said frame means, and means on the tractor connected with the forward portion of said stabilizing member for raising and lowering the front end of the latter to adjust the depth of operation of said furrow opener means.

3. An implement adapted to be connected to a tractor having a tractor drawbar, said implement comprising tool means, a tractor drawbar receiving member including upper and lower sections spaced apart to receive the tractor drawbar therebetween, generally vertically disposed pivot means for connecting said drawbar receiving member to said tractor drawbar, means including a pair of laterally spaced apart pivot means connecting said tool means with said drawbar receiving member, one of said pair of pivot means being generally vertically adjustable for leveling the implement relative to said drawbar receiving member, a forwardly extending beam member fixed at its rear end to said tool means for movement therewith, and means for adjustably connecting the forwardly extending beam member at its forward end to said tractor, said last mentioned means including a part movably receiving the forward end portion of said beam member and accommodating movement of the latter with said tool means about the axis of said generally vertically disposed pivot means and also movement of said beam member with said tool means when said vertically adjustable pivot member is adjusted vertically.

References Cited in the file of this patent

UNITED STATES PATENTS

| Number | Name | Date |
|---|---|---|
| 158,253 | Curtiss | Dec. 29, 1874 |
| 770,372 | Lake et al. | Sept. 20, 1904 |
| 780,609 | Hoffert | Jan. 24, 1905 |
| 1,765,143 | Fojtik | June 17, 1930 |
| 1,941,013 | Lindgren et al. | Dec. 26, 1933 |
| 1,988,157 | Bowen | Jan. 15, 1935 |
| 2,180,910 | Reynolds | Nov. 21, 1939 |
| 2,322,342 | Bunn | June 22, 1943 |
| 2,337,026 | Cantral | Dec. 21, 1943 |
| 2,405,334 | Silver | Aug. 6, 1946 |
| 2,414,114 | Martin | Jan. 14, 1947 |
| 2,440,550 | Martin | Apr. 27, 1948 |
| 2,483,565 | Strandlund | Oct. 4, 1949 |